US005577417A

United States Patent [19]

Fournier

[11] Patent Number: 5,577,417

[45] Date of Patent: Nov. 26, 1996

[54] TACTILE AND/OR KINESTHETIC MANUAL INFORMATION RETURN CONTROL MEMBER

[75] Inventor: Raymond Fournier, Gometz-Le-Chatel, France

[73] Assignee: Commissariat a l'Energie Atomique, Paris, France

[21] Appl. No.: 329,476

[22] Filed: Oct. 26, 1994

[30] Foreign Application Priority Data

Nov. 8, 1993 [FR] France .................................. 93 13248

[51] Int. Cl.$^6$ .................................. B25J 1/00; B25J 3/00

[52] U.S. Cl. ............................ 74/523; 74/471 XY; 414/5

[58] Field of Search .............................. 74/523, 471 XY; 414/1, 2, 3, 4, 5

[56] References Cited

U.S. PATENT DOCUMENTS

| | | | |
|---|---|---|---|
| 3,535,711 | 10/1970 | Fick | 3/1.2 |
| 3,637,092 | 1/1972 | George et al. | 214/1 CM |
| 4,795,296 | 1/1989 | Jau . | |
| 5,143,505 | 9/1992 | Burdea et al. | 414/5 |
| 5,354,162 | 10/1994 | Burdea et al. | 414/5 |
| 5,389,849 | 2/1995 | Asano et al. | 901/2 X |
| 5,396,266 | 3/1995 | Brimhall | 74/471 XY X |

FOREIGN PATENT DOCUMENTS

| | | |
|---|---|---|
| 0384806 | 8/1990 | European Pat. Off. . |
| 2228783 | 9/1990 | United Kingdom . |
| 91/11775 | 8/1991 | WIPO . |

*Primary Examiner*—Charles A. Marmor
*Assistant Examiner*—Saul Rodriguez
*Attorney, Agent, or Firm*—Burns, Doane, Swecker & Mathis, LLP

[57] ABSTRACT

It is proposed that a real or virtual slave system with p degrees of freedom is controlled by means of a manual control member comprising a handle (10) formed by an active part (12) and one or two information return parts (14). A speed or displacement transducer or sensor (24) can be mounted in the active part (12) in order to produce signals used for controlling the slave system. Actuators, e.g. fitted in a support connected to the handle (10) by a flexible cord (22), receive informations from the slave system and transform them into a torque. This torque is transmitted to the information return part (14), e.g. by cables (30,34), so that a stress or force representative of the information from the slave system is applied to the hand of the operator.

18 Claims, 4 Drawing Sheets

TACTILE AND/OR KINESTHETIC MANUAL INFORMATION RETURN CONTROL MEMBER

DESCRIPTION

Figure 1A:
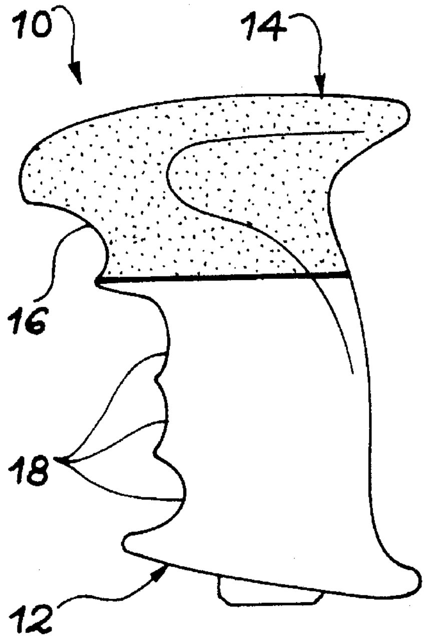

The invention relates to a control member designed for actuation by the hand of a human operator, so as to control a real or virtual slave system, by supplying to the operator a tactile and/or kinesthetic information return.

A control member according to the invention can be used for controlling any random real or virtual slave system, particularly in teleoperation, simulators, Computer Assisted Design (CAD) and Computer Assisted Design and Manufacture (CAD/M), etc., said slave system generally having six degrees of freedom.

The hitherto known manual control members are constituted by data gloves, handles and pens, master arms and control columns.

Data gloves (cf. e.g. WO-A-91 11775) are gloves equipped with devices making it possible to measure their absolute position in space and devices making it possible to measure the relative position of the fingers. Their applications mainly relate to the field of simulation and that of man-machine interfaces. They may be able to store informations of a tactile or kinesthetic type by the use of exoskeletons or the external mobilization of the joints of the operator's hand.

The main advantage of data gloves is a good adaptation to applications concerning simulation. However, they suffer from numerous disadvantages. Among these reference can in particular be made to inadequate reliability, a large number of degrees of freedom, a difficult fitting to the operator's hand, a different calibration for each user and, in certain cases, for each application of the glove, large overall dimensions of the kinesthetic return systems and their very constraining and uncomfortable character.

Handles and pens have the same type of devices as data gloves for measuring their absolute position in space. They are used for defining positions or for designating articles in simulation systems or in CAD and CAD/M systems and they fulfil equivalent functions to those of computer mice. They can have up to 6 degrees of freedom. However, the existing handles and pens are not generally equipped with an information return system in tactile or kinesthetic form.

In the article by Robert Stone "Virtual reality and telepresence", published in Robotica, 1992, vol. 10, pp. 461 to 467, it is proposed that a virtual system be controlled by means of a handle with six degrees of freedom equipped with three inflatable cushions for restoring to the operator a tactile impression of contact with a virtual object. However, the information return is very limited, because each cushion only has one degree of freedom. It is therefore a rough approximation which is unable to restore to the operator all the degrees of freedom of a slave system having six degrees of freedom and in particular the degrees of orientation freedom.

U.S. Pat. No. 4,795,296 also describes a handle having a return part for informations from the slave gripping system. This part is a trigger having two degrees of freedom, so as to restore to the operator position and force or stress informations. With a facing guard, the trigger also forms a control member by means of which the operator actuates pliers having two jaws. The informations restored to the operator relate to the gripping force and the lateral displacement of the pliers during the centering thereof on the object to be grasped. The information concerning the lateral displacement of the pliers is not directly linked with a movement controlled by the operator. Consequently said information return is very difficult to evaluate. Moreover, a failure of the information return system may interfere with the control of the slave system and may even prevent said control.

Master arms have been designed and developed for telemanipulation applications, particularly in master-slave telemanipulators with or without force return and can be active or passive. In the latter case, they are essentially learning means for industrial manipulators and teleoperators.

The essential advantage of master arms is their good adaptation to telemanipulation, but they are expensive, heavy and cumbersome. Moreover, when equipped with a kinesthetic information return, the compromises between the useful volume and the quality of said return are very poor.

Finally, control columns (cf. particularly EP-A-384,806) are devices for measuring displacements, stresses or forces integrated into working stations or button boxes. Control columns have the advantages of low cost and high performance character when the applications are simple and do not exceed three degrees of freedom. However, they do not have an information return device. Moreover, they have a generally limited useful volume, a number of degrees of freedom which rarely exceeds three and must necessarily be positioned on fixed supports.

The invention essentially relates to an information return control member of a novel type actuatable by an operator in such a way as to control a real or virtual slave system in a simple, inexpensive and easily performable manner, making it possible to obtain a satisfactory compromise between the useful volume and the quality of the information return, for in general six degrees of freedom.

The invention also relates to an information control member, in which an interruption or failure of the information return system does not prevent the control of the slave system.

According to the invention, this result is obtained by means of a manual control member of a slave system incorporating:

- a handle including an active part and at least one information return part, which is mobile with respect to the active part,
- means for controlling movements of the slave system in response to an action on the handle and
- means for controlling movements of each information return part with respect to the active part, in response to information return signals from the slave system, characterized in that the means for controlling movements of the slave system are sensitive to an action on the active part of the handle and independent of the position of the information return part with respect to said active part.

In a thus designed control member, the hand of the operator is in permanent contact with the information return part forming the handle, so that said hand receives a force, whose direction and amplitude are representative of a real or virtual force applied to the slave system. Advantageously, the force exerted on the operator's hand by the information return part is then proportional to said resistant force.

Preferably, the slave system has p degrees of freedom, the handle has q information return parts and each information return part has r degrees of freedom with respect to the active part, with r>2 and q×r>p. Advantageously, there are at the most two information return parts.

In a preferred embodiment of the invention, the manual control member also comprises a support independent of the movement control means of the slave system and the means for controlling the movements of each information return part incorporate at least one actuator installed in said support and means for transmitting movements linking the actuator to the information return part.

In this case, the active part of the handle may either only be connected to the support by a flexible cord in which pass the movement transmission means, or mechanically connected to the support by an articulated arm along which can pass the movement transmission means.

The movement transmission means preferably comprise at least two cables which can slide in sheaths. A first of these cables connects a first actuator to the information return part through a movement inversion means and at least one second of said cables directly connects a second actuator to the information return part. The slave system has p degrees of freedom, the control member comprises p second cables and p second actuators. It should be noted that, as a variant, the actuator or actuators can also be integrated into the handle.

When the handle comprises a single information return part, the latter can form a single end portion or a central portion of the handle. It can also have several protuberances located in openings formed in the active part.

In order to be sure that the operator keeps his hand on the information return part of the handle during the effective control of the slave system, the information return part preferably carries at least one button controlling the coupling of the control member to the slave system.

The invention is described in greater detail hereinafter relative to non-limitative embodiments and with reference to the attached drawings, wherein show:

FIGS. 1A to 1D front views illustrating four possible embodiments of a manual control member according to the invention.

Figure 2:
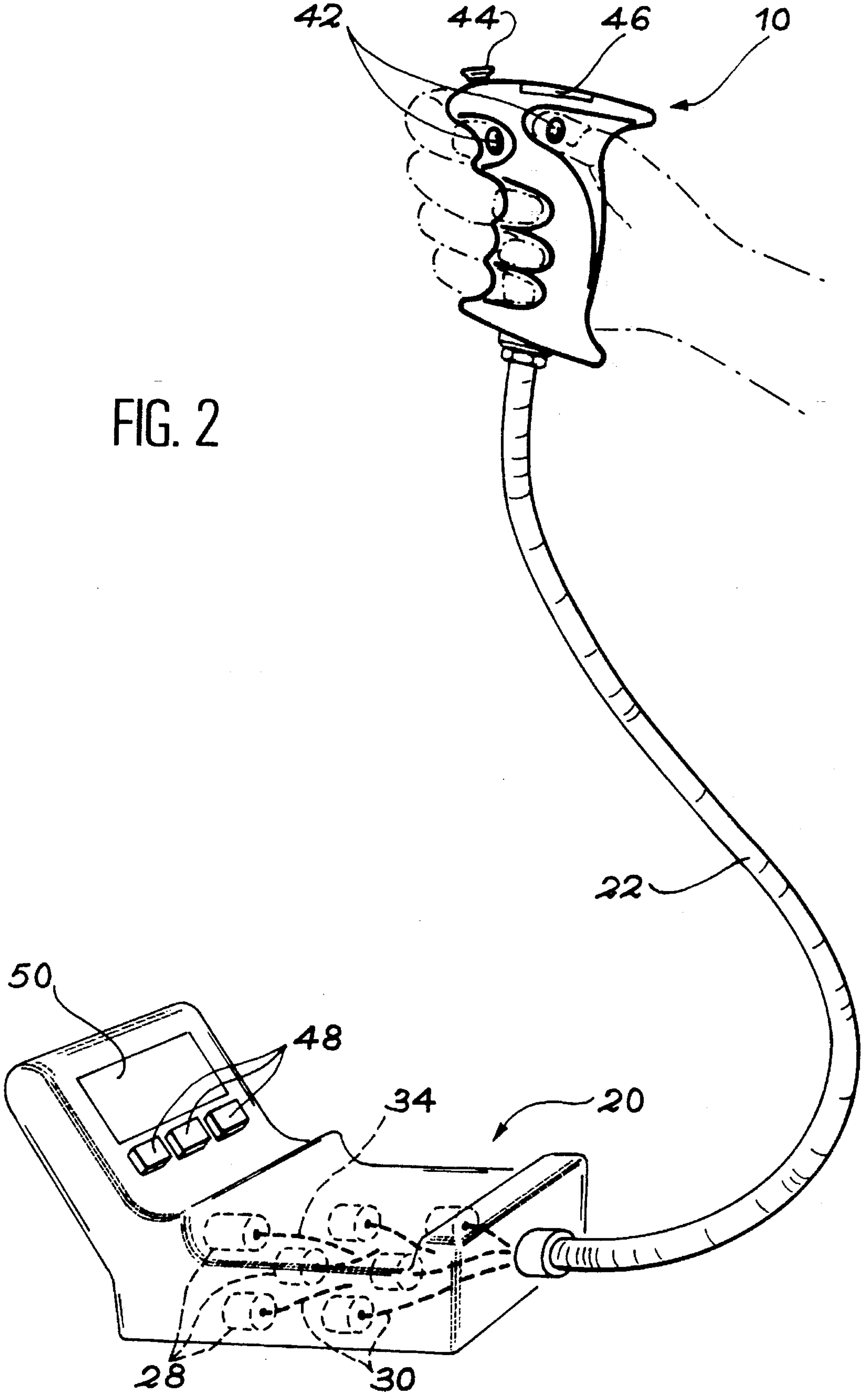

FIG. 2 a perspective view diagrammatically illustrating a manual control member according to the invention having the handle according to FIG. 1A.

Figure 3:
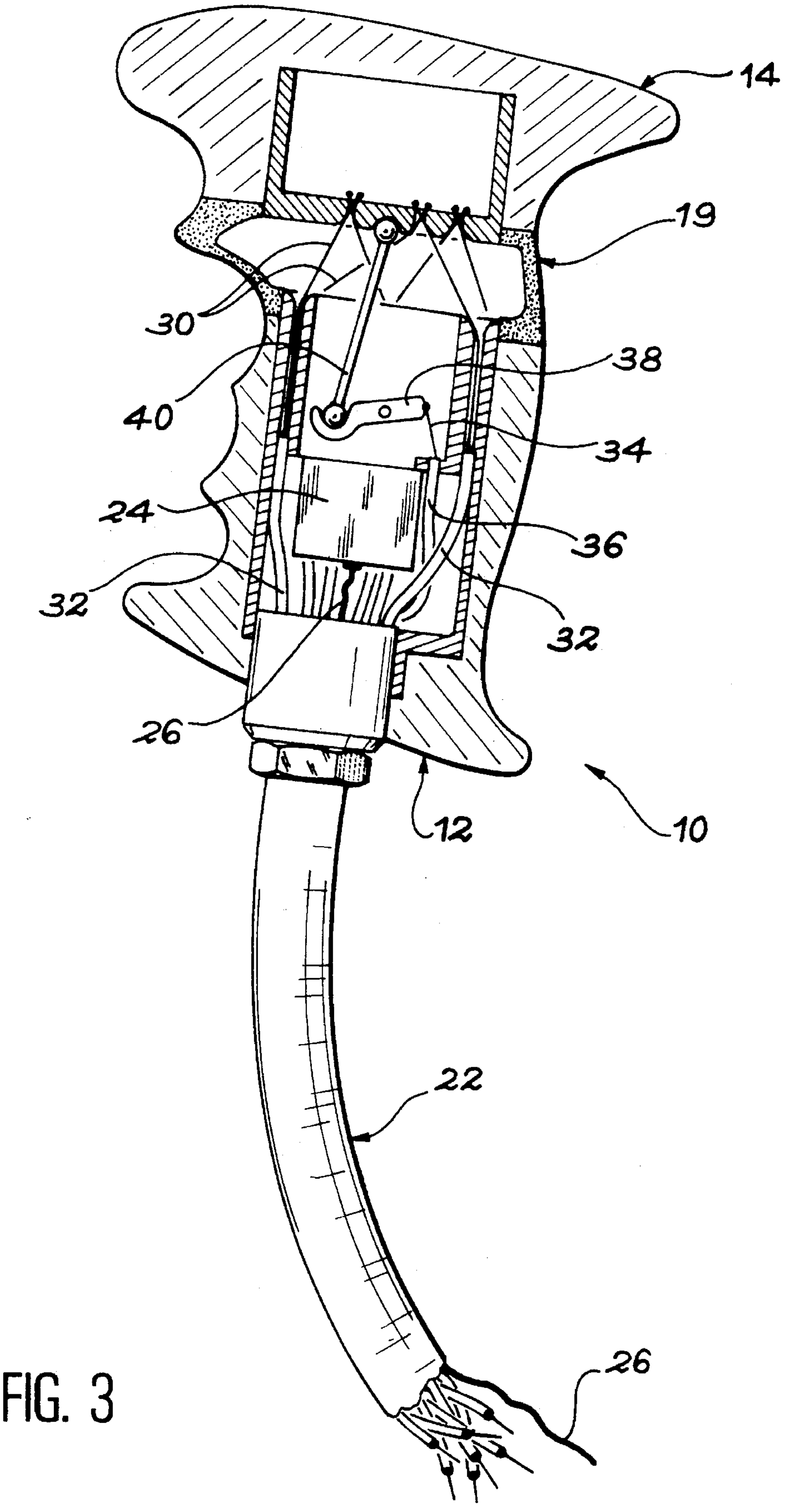

FIG. 3 a larger scale view representing, in a partial longitudinal section, the handle and contiguous portion of the cord of the manual control member illustrated in FIG. 2.

Figure 4:
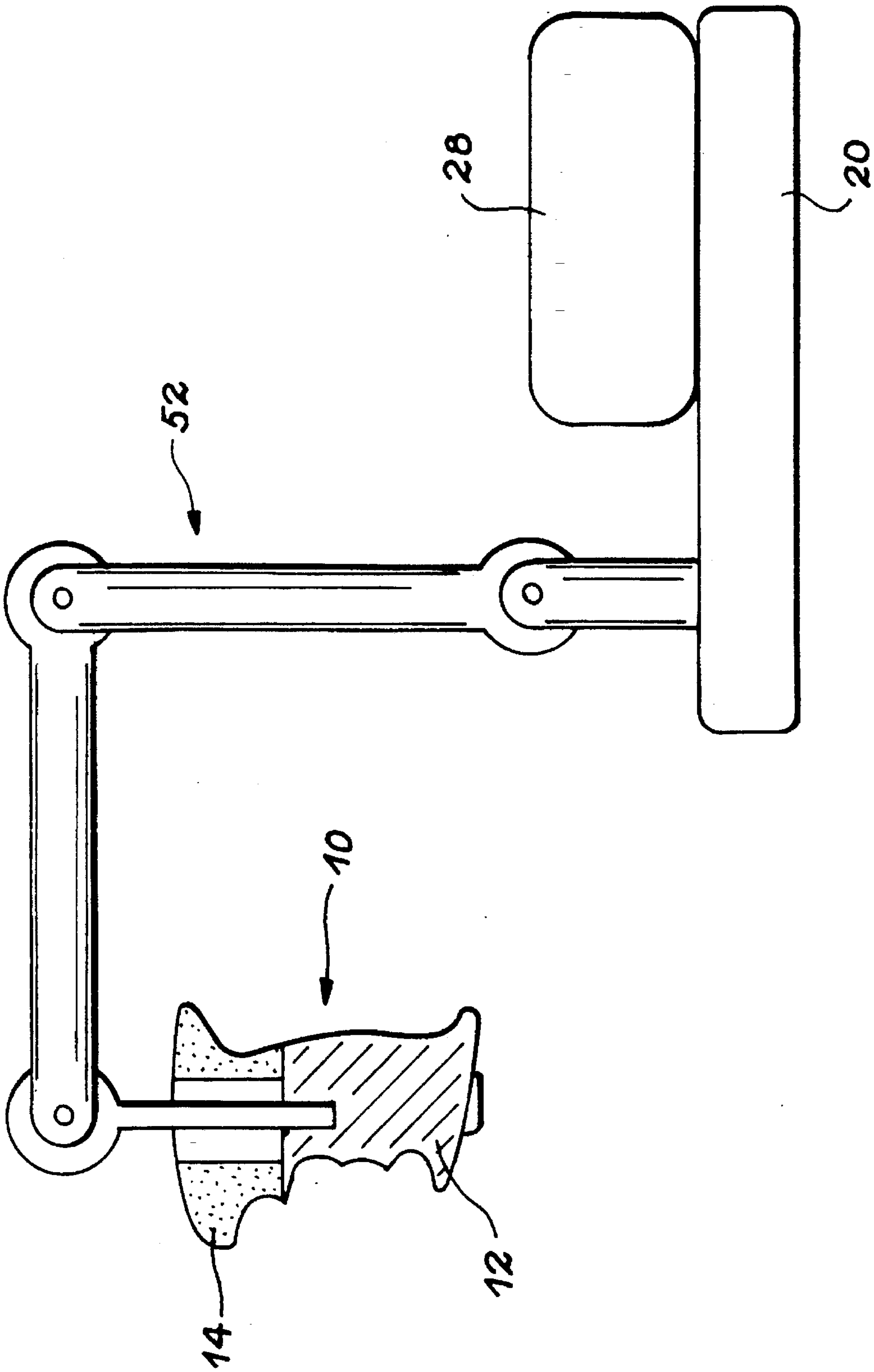

FIG. 4 another embodiment of the invention, in which the handle is connected to the support by an articulated arm.

The manual control member according to the invention essentially comprises a handle which can be grasped by the hand of a human operator. According to the invention, said handle comprises an active part on which acts the hand of the operator, as well as one or two tactile and/or kinesthetic information return parts. The handle has six degrees of freedom.

In the drawings the handle is given the general reference 10.

In the embodiment of FIG. 1A, the handle 10 comprises an active part 12 and an information return part 14, which are juxtaposed, the part 14 being mobile with respect to the active part 12. More specifically, the active part 12 of the handle constitutes the essence of the latter, with the exception of its upper end, which is formed by the information return part 14.

In the embodiment shown, the information return part 14 has impressions 16 for receiving the thumb and index finger of the operator's hand, when the other fingers are received on the impressions 18 formed on the active part 12. In view of the fact that the information return part 14 can move with respect to the active part 18, the continuity of the outer surface of the handle 12 between these two parts is ensured by a flexible ring 19. (FIG. 3)

Figure 1B:
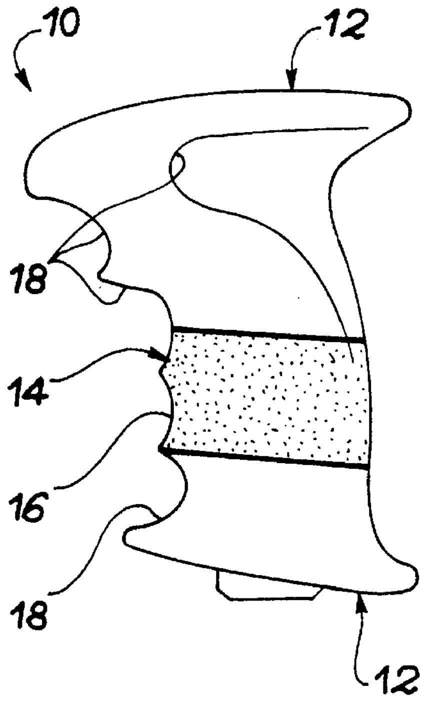

In the embodiment illustrated in FIG. 1B, the handle 10 comprises an information return part 14 intercalated in mobile manner between two portions of an active part 12. The active part 12 then forms the two ends of the handle 10, whereas the central portion of the latter is formed by the information return part 14. In this case, the information return part 14 e.g. carries an impression 16 for receiving the third finger of the operator's hand, whereas the other fingers are received in the impression 18 formed on the two portions of the active part 12. Two not shown flexible rings are then provided for ensuring the continuity between the information return part 14 and the two portions of the active part 12.

Figure 1C:
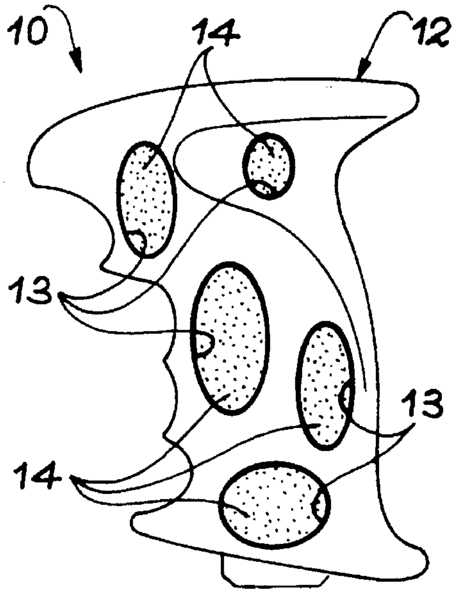

FIG. 1C illustrates a third embodiment, in which the handle 10 is totally formed by an active part 12 perforated by one or more openings 13. These openings house protuberances of a single information return part 14, fitted in mobile manner within the active part 12. The shape, number and location of the openings 13 in which are located the protuberances of the information return part 14 can be of a random nature. In exemplified, but non-exclusive manner, they correspond to the ends of certain of the operator's fingers.

Figure 1D:
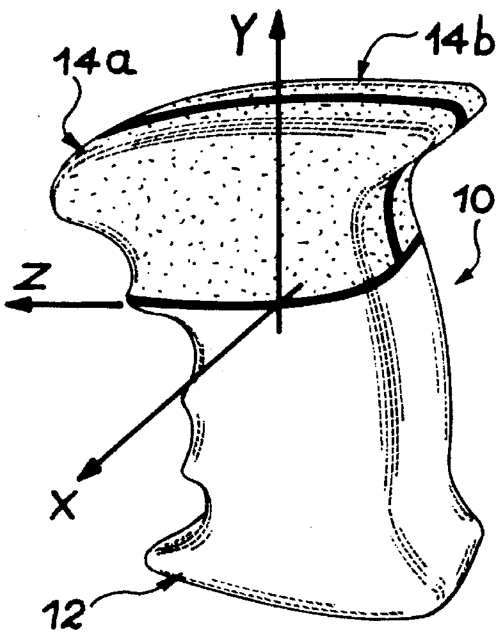

Finally, in the fourth embodiment illustrated in FIG. 1D, the handle 10 is mainly formed by an active part 12, except in its upper portion, as in the embodiment of FIG. 1A. However, in place of being formed by a single information return part, the upper end of the handle has in this case two different information return parts designated by the references 14*a* and 14*b* in FIG. 1D. Each of these information return parts is then mobilized independently of the other with respect to the active part 12.

More specifically, the two information return parts 14*a*, 14*b* are arranged symmetrically with respect to the median plane of the handle 10 and have in each case four degrees of freedom with respect to the active part 12 when the slave system has six degrees of freedom. Thus, each part 14*a*,14*b* has three degrees of freedom along the transverse axis OX, longitudinal axis OY and the axis OZ orthogonal to the two preceding axes, and one degree of freedom of rotation around the transverse axis OX. The degrees of freedom of rotation about the axes OY and OZ are represented by relative translations of the parts 14*a* and 14*b* along the axes OZ and OY respectively.

A description in greater detail will now be given of a manual control member according to a first embodiment of the invention, equipped with the handle 10 of FIG. 1A and with reference to FIGS. 2 and 3.

As illustrated in FIG. 2, the active part of the handle 10 is connected by its lower end to a support 20 in order to serve as a receptacle for the same. This connection is ensured by a flexible cord 22, whereof one end is fixed to the lower end of the handle 10 and whose opposite end is fixed to the support 20.

Therefore the handle 10 has six degrees of freedom enabling it to control a not shown slave system with six degrees of freedom and which can be of a real or virtual nature. Thus and solely in exemplified manner, it can be an articulated arm of a telemanipulator, a simulator or a CAD or CAD/M system. The support 20 is connected to the slave system by appropriate, not shown wiring.

As is more particularly illustrated by FIG. 3, a speed and/or displacement transducer or sensor 24 is mounted in fixed manner within the active part 12 of the handle 10. This transducer 24 makes it possible to measure the speed and/or displacement of the handle 12 when placed in the operator's hand. The measurements performed are transformed into electrical signals, which are passed to the support 20 by an electric conductor 26 placed in the flexible cord 22. These signals are then transmitted to the slave system e.g. by means of another electric conductor, so as to control said slave system as regards speed and/or displacement, as a function of the nature of the measurements performed by the transducer 24.

According to the invention, the manual control member illustrated in FIGS. 2 and 3 also has means making it possible to control a movement of the information return part 14 with respect to the active part 12, in response to an information return signal emitted by the slave system. This information return signal can be of widely varying natures, as a function of the type of slave system controlled and as a function of the envisaged application.

It can in particular be a force or stress return making it possible to transmit to the operator's hand a force signal proportional to a real or virtual resistant force supported or withstood by the slave system. In the case where the slave system is constituted by a slave telemanipulator arm, said signal can be representative of the slave arm or another part supported by the latter engaging with an obstacle and proportional to the reaction force opposed by said obstacle. The information return signal can also be representative of the approach of a forbidden area by a real or virtual slave system.

In the embodiment illustrated in FIGS. 2 and 3, the means making it possible to control the movement of the information return part 14 comprise p+1 actuators 28 (FIG. 2), which are located in the support 20. In this case, p represents the number of degrees of freedom of the slave system, i.e. six in the embodiment illustrated in the drawings. In this example, the control means consequently comprise seven actuators 28, which can be of different types. Thus and solely in exemplified manner, they can be electrical actuators such as small electromagnets, pneumatic actuators such as jacks, etc.

Each of the actuators 28 is connected to the slave system e.g. by an electric conductor, so as to be able to receive an information return signal representative of one degree of freedom of the latter. This signal is transformed by each of the actuators 28 into a torque, which is transmitted to the information return part 14 by movement transmission means mainly passing within the flexible cord 22.

More specifically, p actuators 28 (six in the embodiment described) act on the information return part 14 of the handle 10, through the movement transmission means, in accordance with the p degrees of freedom of said part 14 with respect to the active part 12. The last actuator 28 acts on the information return part 14 so as to oppose actions exerted by other actuators, so as to keep said part 14 stationary relative to the active part 12 when no information return is taking place. This arrangement is explained by the structure of the movement transmission means, which are interposed between the actuators 28 and the information return part 14 in the embodiment shown in FIGS. 2 and 3.

Thus, in the embodiment described, the movement transmission means between the actuators 28 and the information return part 14 are constituted by sliding cables, which can only exert tensile stresses.

More specifically, each of the six actuators corresponding to the six degrees of freedom of the slave system and the information return part 14 acts on a cable 30 able to slide in a sheath 32 within the flexible cord 22 and its opposite end is fixed to the information return part 14 in accordance with the triangular arrangement identical to that of a so-called Steward platform. In other words, the six cables 30 are fixed pairwise to the three apices of a triangle, on the information return part 14.

In order to oppose the tensile stress exerted on the information return part 14 by the cable 30, the remaining actuator 28 acts on a seventh cable 34, which also slides in a sheath 36 within the flexible cord 22, but whose opposite end acts on the information return part 14 by means of a movement inversion mechanism. This mechanism transforms the tensile stress exerted by the cable 34 into a compressive stress applied to the part 14. It acts on the latter in the centre of the triangle at the apices of which are attached the cables 30.

In the embodiment illustrated in FIG. 3, the movement inversion mechanism comprises a lever 38 and a thrust or push rod 40. The lever 38 is mounted in pivoting manner, in its central portion, on the active part 12 and the cable 34 is attached to one of its ends. The opposite end of the lever 38 bears on one end of the push rod 40. The opposite end of said rod 40 bears on the information return part 14, in the centre of the triangle, whose apices are used for the attachment of the cables 30.

The arrangement described hereinbefore makes it possible to apply to the hand of the operator a force, whose direction and intensity are representative of an information from the slave system and taking into account all the degrees of freedom of said system.

The means used for controlling a movement of the information return part or parts 14 can differ from those described hereinbefore. Thus, the actuators can be placed directly within the handle 10, so as to enable each to act individually on one of the two information return parts 14*a*, 14*b*, in the handle embodiment illustrated in FIG. 1D. In this case, the support 20 and the cord 22 can optionally be eliminated.

Advantageously and as illustrated in FIG. 2, the information return part 14 is provided on its outer surface with one or two buttons 42 for controlling the coupling of the control member to the slave system. In the embodiment of the handle 10 illustrated in FIG. 1A, the buttons 42 can be placed in each of the impressions 16 formed on the information return part 14 in order to receive the thumb and index finger of the operator's hand.

As a result of the fact that the actuation of the buttons 42 conditions the coupling of the control member to the slave system, it is certain that the operator's hand will be in contact with the information return part 14 if a force representative of such an information return from the master arm is applied to said part 14.

As is diagrammatically illustrated in FIG. 2, the handle 10 can also be equipped with various other buttons such as an emergency stop button 44, as well as one or more displays 46 on which can appear various informations such as variations, force and moment states, etc.

The support 20 can also have one or more control buttons 48 and one or more displays 50, as illustrated in FIG. 2.

FIG. 4 very diagrammatically illustrates another embodiment of the invention in which, instead of being connected to the support 20 by a flexible cord, the active part 12 of the handle 10 is fixed to one end of an articulated arm 52, whose opposite end is mounted on the support 20

In this case, the actuators 28 can remain associated with the support 20. They act on the information return part 14 of the handle by a transmission system such as a system of sliding cables identical to that described hereinbefore relative to FIG. 3, said cable system then being guided on the articulated arm 52.

The actuators can also be distributed along the structure of the articulated arm, e.g. in its final segment. The arm is then balanced in order to compensate the weight of the actuators.

The structure of the articulated arm 52 can be adapted to each of the slave systems which it is wished to control. For this purpose, it is also possible to use segments and modular articulations assembled, as required, with the handle 10.

The control of the movements of the slave system can be realized either using the fitted transducers, as in the embodiments described relative to FIGS. 2 and 3, or by means of instrumentation associated with each of the articulations of the articulated arm 52.

In this arrangement, the information return means remain completely separate from the control means of the slave system. These information control means can consequently be placed out of service, either voluntarily or by a physical failure (cable breaking, amplifier breakdown), or a data processing failure, without any detrimental affect on the control of the slave system.

I claim:

1. A manual control member of a slave system, wherein the member comprises:

a handle having an outer surface mainly formed of an active part and of at least one information return part, the information return part being separate from and movable with respect to the active part and having at least two degrees of freedom;

means for controlling movements of the slave system in response to an action on the active part of the handle; and means for controlling movements of each information return part with respect to the active part, in response to information return signals from the slave system.

2. A manual control member of a slave system, wherein the member comprises;

a handle having an outer surface mainly formed of an active part and of a single information return part forming an end portion of the handle, the information return part being separate from and movable with respect to the active part and has at least two degrees of freedom;

means for controlling movements of the slave system in response to an action on the active part of the handle; and means for controlling movements of each information return part with respect to the active part, in response to information return signals from the slave system.

3. A manual control member of a slave system, wherein the member comprises:

a handle having an outer surface mainly formed of an active part forming two end portions of the handle, and of a single information return part, the information return part forming a central portion of the handle, intercalated between the end portions, the information return part being separate from and movable with respect to the active part and having at least two degrees of freedom;

means for controlling movements of the slave system in response to an action on the active part of the handle; and means for controlling movements of each information return part with respect to the active part, in response to information return signals from the slave system.

4. A manual control member of a slave system, wherein the member comprises:

a handle having an outer surface mainly formed of an active part perforated by openings, and of at least one information return part having protuberances located in the openings, the information return part being separate from and movable with respect to the active part and having at least two degrees of freedom;

means for controlling movements of the slave system in response to an action on the active part of the handle; and means for controlling movements of each information return part with respect to the active part, in response to information return signals from the slave system.

5. A manual control member of a slave system, wherein the member comprises:

a handle having an outer surface mainly formed of an active part and of two information return parts, the information return parts being separate from and independently movable with respect to the active part and having at least two degrees of freedom;

means for controlling movements of the slave system in response to an action on the active part of the handle; and means for controlling movements of each information return part with respect to the active part, in response to information return signals from the slave system.

6. The manual control member according to claim 5, wherein the information return parts are arranged symmetrically with respect to a median plane of the handle and form an end portion of the handle.

7. A manual control member of a slave system, wherein the member comprises:

a handle having an outer surface formed of an active part, of at least one information return part, the information return part being separate from and movable with respect to the active part and having at least two degrees of freedom, and of at least one flexible member ensuring a continuity of the outer surface between the active and information return parts;

means for controlling movements of the slave system in response to an action on the active part of the handle; and means for controlling movements of each information return part with respect to the active part, in response to information return signals from the slave system.

8. A manual control member of a slave system, having p degrees of freedom, wherein the member comprises:

a handle having an outer surface mainly formed of an active part and of q information return parts separate from and movable with respect to the active part, each information return part having r degrees of freedom with respect to the active part, with r>2.

means for controlling movements of the slave system in response to an action on the active part of the handle;

a support independent of the movement control means of the slave system; and means for controlling movements of each information return part with respect to the active part, in response to information return signal from the slave system, the movement control means of each information return part including at least one actuator mounted in the support and movement transmission means connecting the actuator to the information return part.

9. The manual control member according to claim 8, wherein the active part of the handle is connected to the support by a flexible cord through which the movement transmission means extends.

10. The manual control member according to claim 8, wherein the active part of the handle is mechanically connected to the support by an articulated arm through which the movement transmission means extends.

11. The manual control member according to claim 8, wherein the movement transmission means includes at least two cables slidably disposed in sheaths, a first of the cables connecting a first actuator to each information return part through a movement inversion means and a second of the cables directly connecting a second actuator to each information return part.

12. The manual control member according to claim 11, comprising p second actuators.

13. A manual control member of a slave system, wherein the member comprises:

a handle having an outer surface mainly formed of an active part and of at least one information return part, the information return part being separate from and movable with respect to the active part and having at least two degrees of freedom;

means for controlling movements of the slave system in response to an action on the active part of the handle; and means for controlling movements of each information return part with respect to the active part, in response to information return signals from the slave system, the movement control means of the information return part comprising at least one actuator mounted in the handle.

14. A manual control member of a slave system, wherein the member comprises:

a handle having an outer surface mainly formed of an active part and of at least one information return part separate from and movable with respect to the active part and having at least two degrees of freedom;

means for controlling movements of the slave system in response to an action on the active part of the handle, the means comprising a transducer mounted in a fixed manner within aid active part, to measure at least one variable taken in a group comprising speed and displacement of the handle; and means for controlling movements of each information return part with respect to the active part, in response to information return signals from the slave system.

15. A manual control member according to any of claims 1 to 14, wherein the information return part includes at least one button for controlling the coupling of the control member to the slave system.

16. A manual control member according to any of claims 1 to 14, wherein the handle includes at least one display.

17. A manual control member of a slave system, comprising:

a handle, the handle having an outer surface defined by an active part and at least one information return part, the information return part being movable with respect to the active part and having at least two degrees of freedom;

means for controlling movement of a slave system in response to displacement of the handle; and means for controlling movements of each information return part with respect to the active part in response to information return signals from the slave system, wherein the slave system movement control means controls movement in response to displacement of the handle, in its entirety.

18. A manual control member of a slave system, comprising:

a handle, the handle having an outer surface including an active part and at least one information return part, the information return part being movable with respect to the active part and having at least two degrees of freedom;

means for controlling movement of a slave system in response to displacement of the handle, in its entirety;

means for controlling movements of each information return part with respect to the active part in response to information return signals from the slave system.

* * * * *